Jan. 14, 1969  S. BARKER ET AL  3,421,777
DOLLY FOR SEMITRAILER
Filed March 2, 1967  Sheet 1 of 2
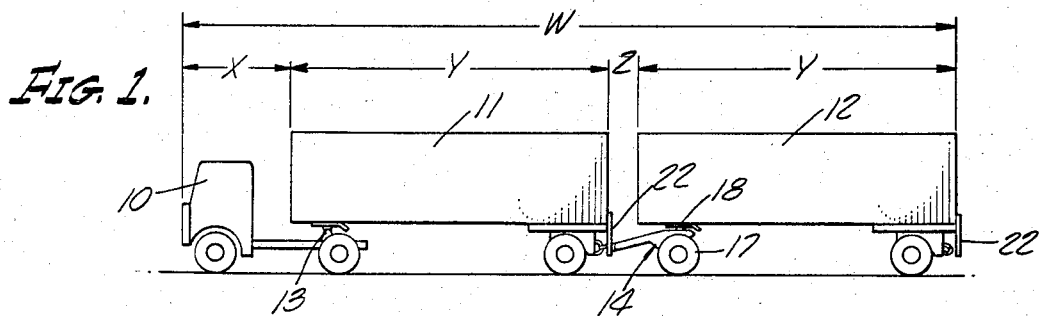
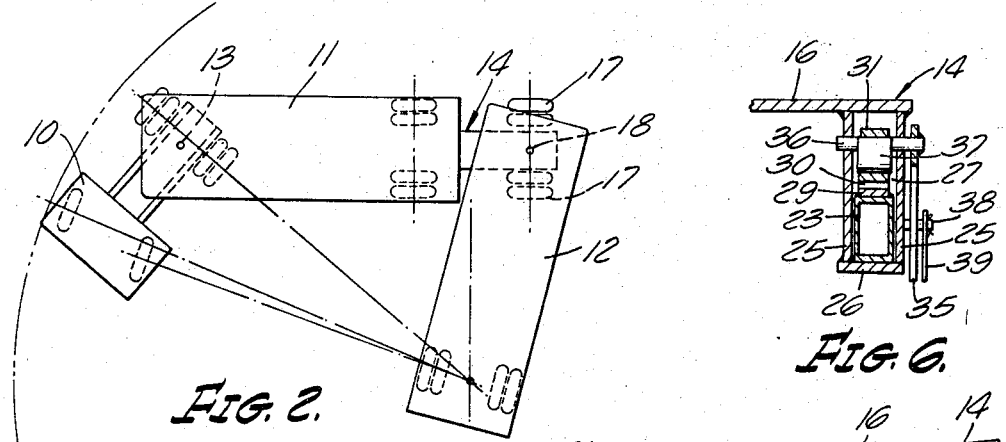
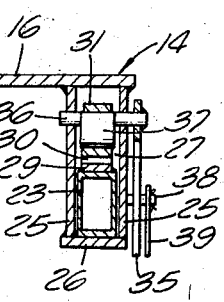
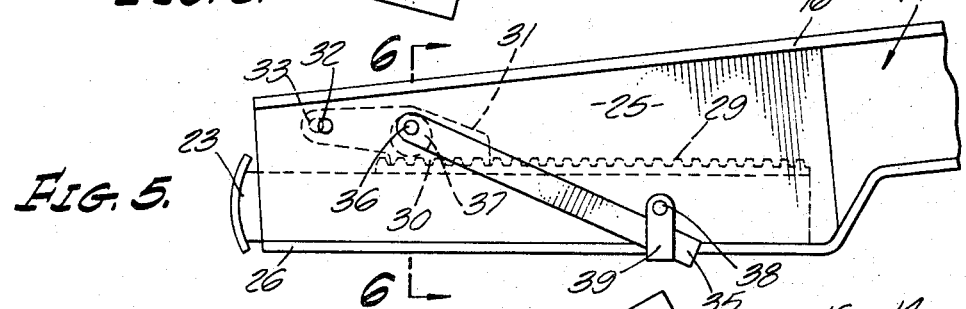
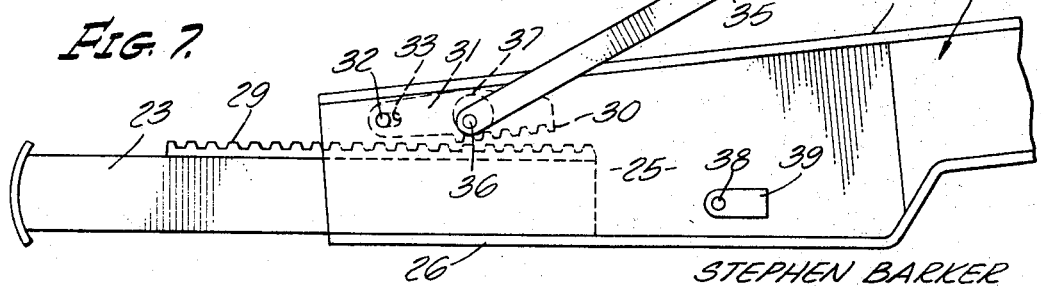
STEPHEN BARKER
PAUL F. BENNETT
INVENTORS.
BY *Lyon & Lyon*
ATTORNEYS Jan. 14, 1969   S. BARKER ET AL   3,421,777
DOLLY FOR SEMITRAILER
Filed March 2, 1967   Sheet 2 of 2
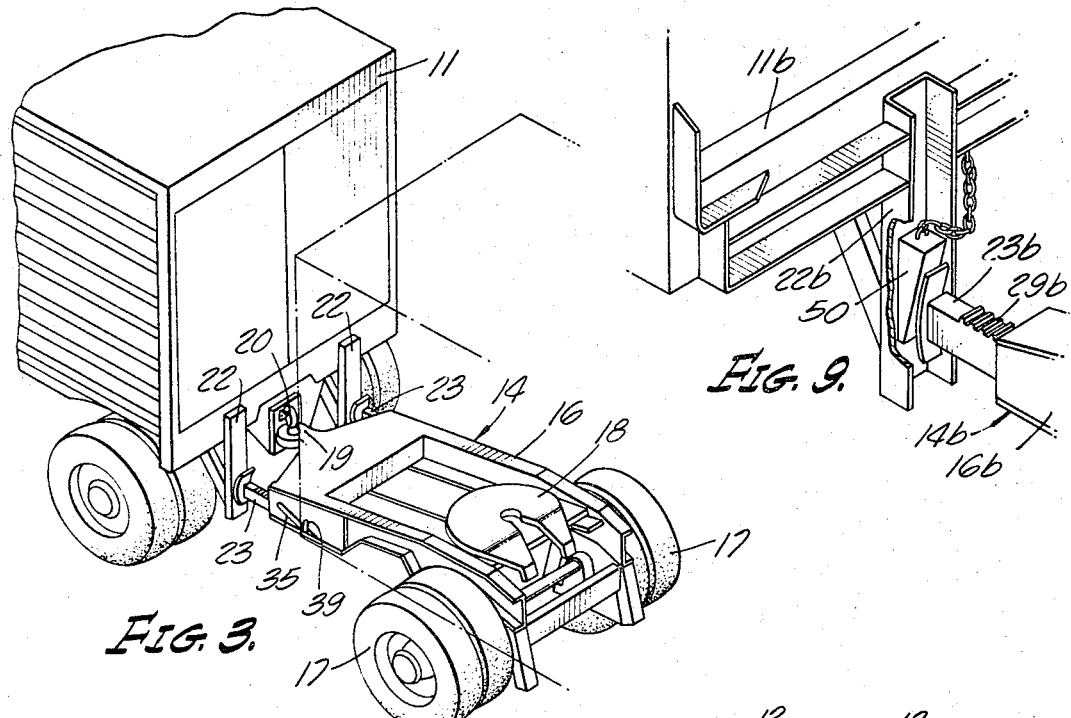
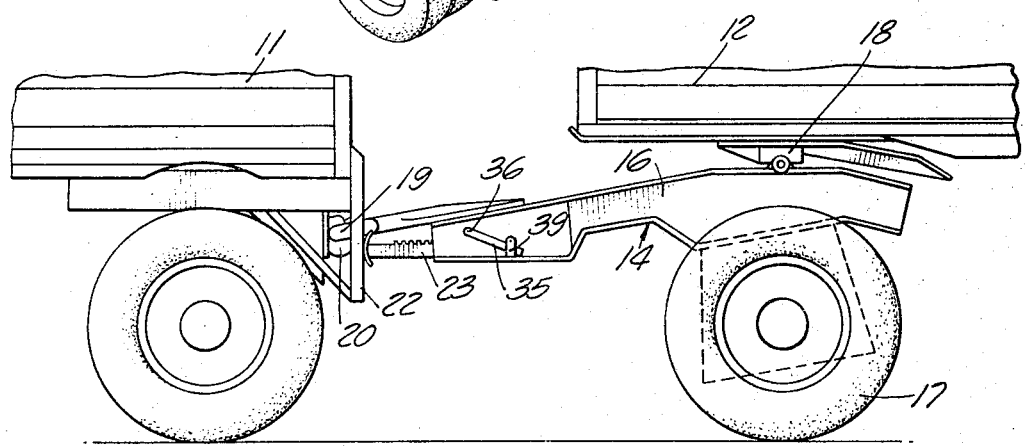
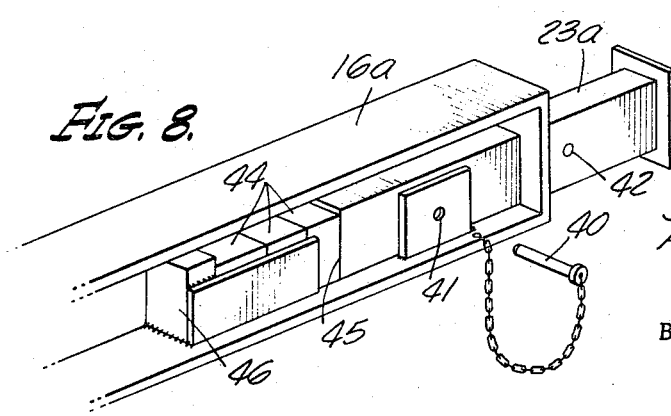
STEPHEN BARKER
PAUL F. BENNETT
INVENTORS.
BY Lyon & Lyon
ATTORNEYS United States Patent Office 3,421,777
Patented Jan. 14, 1969

3,421,777
DOLLY FOR SEMITRAILER
Stephen Barker, Temple City, and Paul F. Bennett, San Marino, Calif., assignors to Utility Trailer Mfg. Company, City of Industry, Calif., a corporation of California
Filed Mar. 2, 1967, Ser. No. 620,010
U.S. Cl. 280—408                5 Claims
Int. Cl. B60d 1/04; B60d 1/14; B62d 53/06

ABSTRACT OF THE DISCLOSURE

A dolly for connecting two semitrailers in tandem has laterally spaced plungers which contact the lead semitrailer, and reduce the lateral pivotal movement to the minimum required for highway travel. This, in turn, reduces the clearance space required between the semitrailers to allow longer, greater capacity, semitrailers within a given overall length, and also minimizes jackknifing action under sharp braking. Furthermore, the plungers may be moved to eliminate all laterial pivotal movement, for optimum maneuverability in backing.

Background of the invention

This invention relates to transportation apparatus and is particularly directed to improvements in a dolly for connecting two semitrailers in tandem. A device of this type may be classified as a land vehicle, wheeled, semitrailer. Devices of this general type are shown in United States patents to Knox No. 2,254,532, Black No. 3,151,880 and Walther No. 3,151,881. While these prior art patents disclose dollies for connecting semitrailers in tandem, the structures disclosed cannot achieve all of the advantages of (a) minimum space between semitrailers for maximum capacity within a given overall length, (b) minimizing possible jackknifing action under sharp braking, and (c) optimum maneuverability in backing.

Summary

Briefly stated, this invention concerns a dolly for a semitrailer having laterally spaced plungers for contact with its towing vehicle, to limit lateral swinging movement between the dolly and the towing vehicle.

Brief description of the drawings

FIGURE 1 is a side elevation in diagrammatic form showing a tractor and a pair of semitrailers connected for highway transportation.

FIGURE 2 is a top plan view in diagrammatic form showing the maximum angularity which may be achieved between the tandem semitrailers during a backing operation, and with the dolly device prevented from swinging laterally with respect to the first semitrailer.

FIGURE 3 is a perspective view partly broken away showing the dolly device of this invention connected to the read end of the forward semitrailer, and showing the plungers fully extended preparatory to backing up the assembly.

FIGURE 4 is a side elevation of the device shown in FIGURE 3 and also showing the second semitrailer supported on a fifth wheel connection carried on the dolly.

FIGURE 5 is a side elevation showing a preferred form of plunger and latching device mounted on the dolly frame, the plunger being shown in fully retracted position.

FIGURE 6 is a sectional elevation taken substantially on the lines 6—6 as shown in FIGURE 5.

FIGURE 7 is a side elevation similar to FIGURE 5, showing the plunger in an extended position.

FIGURE 8 is a perspective view showing a modified form of plunger device.

FIGURE 9 is a perspective showing another modified form of plunger device.

Description of the preferred embodiment

Referring to the drawings, a truck or tractor 10 is connected to pull a pair of semitrailers 11 and 12 connected in tandem. The semitrailers are duplicates. The tractor 10 is conventional and is provided with the usual fifth wheel connection 13 for the first semitrailer 11. A dolly device generally designated 14 supports the forward end of the second semitrailer 12 and forms the towing connection from the rear end of the first semitrailer 11.

As best shown in FIGURES 3 and 4, the dolly device 14 has a longitudinal frame 16 supported on laterally spaced road wheels 17. The fifth wheel device 18 is mounted on the frame. A draft eye 19 is mounted centrally on the forward end of the frame 16 for connection with the draft hook 20 provided on the rear end of the first semitrailer 11.

Each of the semitrailers is conventionally provided on its rearward end with a pair of laterally spaced bumpers 22 for engagement with a stationary dock (not shown). In accordance with our invention retractable plungers 23 are mounted for longitudinal movement on the dolly frame 16 and are laterally spaced for engagement with these bumpers 22. As shown in FIGURES 5, 6 and 7, each plunger 23 is formed as a hollow box section and is slidably mounted between parallel vertical plates 25 which form a part of the dolly frame 16. A floor plate 26 connects the lower depending edges of the side plates 25, and the plates cooperate to form a pocket 27 for sliding reception of the plunger 23.

Means are provided for releasably locking the plungers 23 in an extended position for highway travel, permitting limited pivotal movement, or in a fully extended position to eliminate pivotal movement, for backing. As shown on the drawings this means includes a gear rack 29 fixed to each of the plungers 23 and a cooperating gear rack 30 mounted on a pawl 31 movably mounted on a stationary transverse pin 32. Each pin 32 passes through a slot 33 in its respective pawl 31. An operating lever 35 is fixed to a transverse pin 36 having an eccentric portion 37 received within a lateral bore in the pawl 31. From this description, it will be understood that swinging of the operating lever 35 from the position shown in FIGURE 5 to the position shown in FIGURE 7 serves to lift the pawl 31 from the locking position shown in FIGURE 5 to the released position shown in FIGURE 7. A stationary pin 38 supporting a pivoted keeper 39 serves to hold the lever 35 in lower position.

In the consideration of FIGURE 1, it will be observed that for a given overall length W of the tractor 10 and semitrailers 11 and 12, and for a given minimum distance X, the maximum length of the trailers Y is achieved when the space Z between them is held to a minimum. If unrestricted lateral swinging movement is permitted between the dolly device 14 and the lead semitrailer 11, the space Z must be considerably greater than that shown on the drawing to prevent any possible contact between the semitrailers during a backing operation. However, by minimizing or eliminating lateral swinging movement by means of the plungers 23, the clearance space Z can be reduced to a minimum while permitting maximum angularity of the semitrailers 11 and 12, as shown in FIGURE 2.

In operation, the tractor 10 and semitrailers 11 and 12 connected in tandem operate in the forward direction in a conventional manner. The plungers 23 on the dolly device 14 are in partially retracted position for highway travel and are latched in that position by means of interengagement of the rack teeth 29, 30 on each plunger 23 and its respective pawl 31. When it is desired to back the entire assembly with maximum maneuverability, the operating levers 35 are raised manually to disengage the pawls 31 from the plungers 23. Each of the plungers 23 is then manually moved forward into engagement with one of the bumper pads 22 present on the rear of the first semitrailer 11. The operating levers 35 are then lowered to bring the pawls 31 into latching engagement with the plungers 23 and thereby hold the plungers in fully projected position. The levers 35 are then swung under the keepers 39. The pitch of the rack teeth 29 and 30 is small enough so that only negligible clearance is permitted between the forward ends of the plungers 23 and the bumper pads 22. Thus, lateral pivotal movement is substantially eliminated between the semitrailer 11 and the dolly device 14, about the hook and eye connection 20, 19. The dolly device 14 thus becomes "rigidized" regarding lateral swinging movement with respect to the semitrailer 11, and then functions as a rearward extension of the semitrailer 11 during the backing movement for maximum maneuverability. This is illustrated diagrammatically in FIGURE 2 of the drawings.

When the backing operation has been completed and it is desired to move in the forward direction again, the plungers 23 are moved to their partially retracted position for highway travel and latched by means of the levers 35.

In the modified form of the invention shown in FIGURE 8, the plungers 23a are slidably mounted on the dolly frame 16a. A pin 40 extends through apertures 41 and 42 to hold the plunger in retracted position. A series of metal filler blocks 44 are provided and may be manually placed between the end 45 of the plunger 23a and the stationary stop 46 to prevent rearward movement of the plunger when in extended position to contact the bumper pads 22.

In the further modification shown in FIGURE 9, plungers 23b are slidably mounted on the dolly frame 16b. These plungers 23b are equipped with rack teeth 29b which are engaged by pawl mounted rack teeth of the type shown in FIGURES 5 and 7. The bumper pads 22b on the rear end of the first semitrailer 11b are formed as open channels for reception of the forward ends of the plungers 23b. A gravity wedge 50 is provided for each of these channels and shaped to be positioned between the channel part and the extreme forward end of the plunger 23b. In this way all of the lost motion for clearance between the plungers 23b and semitrailer 11b is eliminated, and no pivotal movement of the dolly device 14b and semitrailer 11b is possible.

Having fully described our invention, it is to be understood that we are not to be limited to the details herein set forth but that our invention is of the full scope of the appended claims.

We claim:

1. A dolly for towing a semitrailer from a road vehicle having a draft hook at its rear end, the dolly comprising, in combination: a longitudinal frame supported on laterally spaced road wheels, a fifth wheel carried on the frame for supporting connection with an element on the semitrailer, a draft eye mounted centrally on the forward end of the frame for connection with the draft hook on the road vehicle, a pair of plungers mounted for longitudinal movement on the dolly frame, gravity actuated latches for locking the plungers in longitudinally adjusted position, lever operated cams for lifting the latches to an inoperative position, and said plungers laterally spaced on opposite sides of said draft eye for engagement with the rear end of the road vehicle on opposite sides of its draft hook, to minimize lateral swinging movement of the dolly relative to the road vehicle.

2. A dolly for connecting semitrailers in tandem, the forward semitrailer having a draft hook mounted centrally on its rear end, and the rear semitrailer having a kingpin near its forward end, the dolly comprising in combination: a longitudinal frame supported on laterally spaced road wheels, a fifth wheel carried on the frame for supporting connection with the kingpin on a rear semitrailer, a draft eye mounted centrally on the forward end of the frame for connection to the draft hook on a forward semitrailer, a pair of plungers adjustably mounted for longitudinal movement on the dolly frame, gravity actuated latches for locking the plungers in longitudinally adjusted position, lever operated cams for lifting the latches to an inoperative position, and said plungers laterally spaced on opposite sides of said draft eye for engagement with the rear end of the forward semitrailer on opposite sides of its draft hook, to minimize lateral swinging movement of the dolly relative to the forward semitrailer.

3. In combination with a road vehicle having a draft hook at its rear end, and having laterally spaced bumpers on opposite sides of the draft hook, a dolly for towing a semitrailer from the road vehicle, the dolly having a longitudinal frame supported on laterally spaced road wheels, a fifth wheel carried on said frame for supporting connection with an element on the semitrailer, a draft eye mounted centrally on the forward end of said frame for connection with said draft hook on the road vehicle, a pair of plungers mounted for longitudinal movement on the dolly frame, wedge means positioned between the forward ends of the plungers and said bumpers, and said plungers laterally spaced on opposite sides of said draft eye for engagement with said wedge means, to minimize lateral swinging movement of the dolly relative to the road vehicle.

4. In combination with a pair of semitrailers, a dolly for connecting the semitrailers in tandem, the forward semitrailer having a draft hook mounted centrally on its rear end, and having laterally spaced bumpers on opposite sides of the draft hook, the rear semitrailer having a kingpin near its forward end, the dolly having a longitudinal frame supported on laterally spaced road wheels, a fifth wheel carried on said frame for supporting connection with said kingpin on the rear semitrailer, a draft eye mounted centrally on the forward end of the dolly frame for connection to said draft hook on the forward semitrailer, a pair of plungers adjustably mounted for longitudinal movement on the dolly frame, gravity actuated latches for locking the plungers in longitudinally adjusted position, lever operated cams for lifting the latches to an inoperative position, and said plungers laterally spaced on opposite sides of said draft eye for engagement for said bumpers on the forward semitrailer, to minimize lateral swinging movement of the dolly relative to the forward semitrailer.

5. In combination with a pair of semitrailers, a dolly for connecting a semitrailer in tandem, the forward semitrailer having a draft hook mounted centrally on its rear end, and having laterally spaced bumpers on opposite sides of the draft hook, the rear semitrailer having a kingpin near its forward end, the dolly having a longitudinal frame supported on laterally spaced road wheels, a fifth wheel carried on said frame for supporting connection with said kingpin on the rear semitrailer, a draft eye mounted centrally on the forward end of the dolly frame for connection to said draft hook on the forward semitrailer, a pair of plungers adjustably mounted for longitudinal movement on the dolly frame, wedge means positioned between the forward ends of the plungers and said bumpers, and said plungers laterally spaced on opposite sides of said draft eye for engagement with said wedge means, to minimize lateral swinging movement of the dolly relatively to the forward semitrailer.

References Cited

UNITED STATES PATENTS

| | | | |
|---|---|---|---|
| 2,330,897 | 10/1943 | Kirksey | 280—432 |
| 2,714,017 | 7/1955 | Mendez | 280—432 |
| 2,762,634 | 9/1956 | Moseley | 280—432 |
| 3,151,880 | 10/1964 | Black | 280—408 |
| 3,151,881 | 10/1964 | Walther | 280—408 |

FOREIGN PATENTS 901,988  1/1954  Germany.

LEO FRIAGLIA, *Primary Examiner.*

U.S. Cl. X.R.

280—423, 432, 476